United States Patent [19]

Jaco, Jr.

[11] 4,054,443
[45] Oct. 18, 1977

[54] METHOD OF PREPARING IRON POWDER

[75] Inventor: Charles M. Jaco, Jr., York County, S.C.

[73] Assignee: Midrex Corporation, Charlotte, N.C.

[21] Appl. No.: 643,046

[22] Filed: Dec. 22, 1975

[51] Int. Cl.$^2$ .................................................. B22F 1/00
[52] U.S. Cl. ..................................... 75/.5 BA; 75/26; 75/33
[58] Field of Search .......................... 75/.5 BA, 26, 33

[56] References Cited

U.S. PATENT DOCUMENTS

| 3,347,659 | 10/1967 | Volk | 75/.5 BA |
| 3,877,931 | 4/1975 | Neskorg | 75/.5 A |
| 3,910,785 | 10/1975 | Greene | 75/.5 A |

Primary Examiner—Peter D. Rosenberg
Attorney, Agent, or Firm—Ralph H. Dougherty

[57] ABSTRACT

A method for preparing iron powder for powder metallurgy and other applications from particulate iron oxide by reducing the particle size of at least part of the particulate feed material chemically reducing the feed material to increase the percentage of metallization by contact with a gaseous reductant in a shaft furnace at high temperatures, and removing the reduced iron powder product from the furnace. Preferably the product is screened and oversized material is returned to the furnace for additional reduction. An alternative method contemplates additional steps of grinding, and further decrepitation to reduce the particle size of the larger particle fractions.

14 Claims, 2 Drawing Figures

METHOD OF PREPARING IRON POWDER

BACKGROUND OF THE INVENTION

The present invention relates to a method for producing finely divided iron powder from particulate iron ore or agglomerated iron oxide pellets. In recent years the field of powder metallurgy has expanded greatly. Powdered metals are now used in dies, forging blanks and related operations, and in diverse uses such as filter packings. Powders required for these operations are produced by grinding, atomization or in long tunnel kilns or fluidized beds.

Heretofore, the shaft furnace direct reduction processes have been used only to produce pellet, lump or briquette product. Fine materials are considered an undesirable product by the operators of these furnaces, and the operating practices sepcifically are designed to avoid production of fines. Raw materials to feed such furnaces are selected for their ability to remain as lumps or pellets and to avoid decrepitation. When the entire output of a direct reduction furnace is to be utilized as feed for a steelmaking furnace, it must be in suitable form, i.e. lump, pellet, brick, or briquette, to be handled, to be readily melted, to avoid explosion and to avoid being blown out of the steelmaking furnace with the off gases. Therefore, the fines must be agglomerated, usually by briquetting, before such use as electric furnace feed. This increases the cost of producing the electric furnace feed.

I have determined that a significant and variable fraction of the output of a direct reduction shaft furnace can be a highly metallized, highly reduced, finely divided iron powder suitable for use in finely divided form, for example in powder metallurgy applications. This can be done only provided the iron powder has sufficiently small particle size to be used in such applications. Iron powder for powder metallurgy applications commands a premium price, which is much higher than the price of reduced iron feed material for steelmaking furnaces. Therefore production of even a fraction of fines useful for later application as powders can raise the average of furnace output. The finely divided powder product made in a direct reduction furnace is generally more coarse and of poorer quality than powdered metals made by more expensive techniques. However many powder metallurgy applications will allow the blending of the poorer quality fines with the more expensive powders, which can significantly reduce the cost of such powders by 10 percent or more. Machine parts which are formed from metal powders by isostatic pressure can utilize even a higher percentage of the coarse fine materials than other powder metallurgy applications. This is due to the extreme high pressures employed in the forming operation. Other uses such as filter bed are not so sensitive to size gradation. Therefore, I have developed a method of operating a direct reduction shaft furnace to produce a greater quantity of iron powder, or fines, than in normal operation of a direct reduction shaft furnace.

Volk et al, U.S. Pat. No. 3,347,659 discloses a method of making reduced iron oxide powder for powder metallurgy applications in a fluidized bed but it is first necessary to mechanically reduce the particle size to the desired product grain size, after which the powder is chemically reduced. Although it is desirable in the instant process to do some reduction in particle size prior to chemical reduction of the feed material to iron, it is only necessary to have a small amount of the feed stock of the end product particle size. Of course, only a portion of the product need be iron powder. The remainder of the product, which may be anywhere from 20 to 80 percent, will be pellet or lump product which is then screened to separate it from the iron powder. The pellet or lump product is utilized as raw lump material for uses such as electric steelmaking furnace feed or a portion of it may be returned to the direct reduction furnace if a higher percentage of the output is desired as iron powder product. Such recycling also raises the percentage of metallization, a desirable characteristic for both iron powders and lump.

The reader may also be interested in the following U.S. Patents relating to the production of metal powders: Golwynne U.S. Pat. No. 2,638,627, Syrkin et al. Pat. 3,376,129, Holtz U.S. Pat. No. 3,533,135, Lightner Pat. No. 3,692,443, Chao U.S. Pat. No. 3,744,944, Neskora et al. Pat. No. 3,877,931, and Greene et al. U.S. Pat. No. 3,910,785.

OBJECTS OF THE INVENTION

It is the principal object of my invention to provide a method for producing a finely divided, highly reduced, high purity powdered iron feed stock for powder metallurgy applications.

It is also an object of my invention to provide a method for making a finely divided, highly reduced iron powder in a direct reduction shaft furnace or fluidized bed furnace.

It is also an object of my invention to provide a method for improving the economics of operation of a direct reduction plant by making a product having greater value than that currently being produced.

It is another object of my invention to provide a method of attaining a high degree of metallization of finely divided iron oxide material by achieving high percentages of reduction of such material.

It is also an object of my invention to provide a method of producing a finely divided powder by selecting feed materials the characteristics of which will promote production of more finely divided reduced powders or chips.

It is still another object of my invention to provide a method of producing a finely divided iron powder product having particle size gradations closely approximating those found in current commercial grades of powdered metals.

It is another object of my invention to provide a method for producing finely divided iron powder which may be economically blended with other powdered, highly reduced, fine material to produce commercially acceptable feed stocks for certain powder metallurgy applications.

It is a further object of my invention to provide a method for manufacturing a finely divided powdered iron feed stock for powder metallurgy and other applications which may be substituted for more expensive grades of powdered metal feed stocks, in powder metallurgy or related applications.

It is another object of my invention to provide an iron powder product having a metallization in excess of 80%.

It is also an object of my invention to provide an iron powder product having a purity of at least about 94% metallic iron which is suitable for powder metallurgy applications.

BRIEF DESCRIPTION OF THE DRAWINGS

The invention is better understood by referring to the following detailed specification and the appended drawings, in which.

DETAILED DESCRIPTION

By conducting a shaft furnace direct reduction process at certain selected feed choices, temperature ranges, and throughput speeds, I can manufacture a product having a significant proportion of finely divided highly metallized iron powder.

This invention in its basic form comprehends the steps of selecting ores and other components of the feed material from which iron powder is to be prepared, reducing the particle size of the feed material, chemically reducing the feed material to iron having a metallization in excess of about 94% in a direct reduction furnace, controlling the reducing gas temperature between 1550° and 2050° F in the furnace, controlling the pressure between 3 and 15 pounds per square inch in the furnace, and removing the reduced iron powder from the furnace.

Feed materials for the invented process are selected from iron ores, both particulate and lump, iron oxide as pellets or other agglomerated form or even as fines, partially reduced iron from the reduction of iron ores or iron oxides in both pellet, lump and finely divided forms and mixtures of any or all of the foregoing. Feed material includes lump iron ore or agglomerated iron oxide pellets which, for predictable geological and physical reasons, are relatively easy to crumble. Suitable ores include hematite, magnetite and limonite as well as those having geological orgins which result in a laminar or sedimentary structure. Hard, dense, massive lump ores having low porosity and characterized by a blue, shiny, specular appearance tend to fragment on heating. The fragmentation can be violent, occurs in the 700° – 900° F temperature range, and is accompanied by a loud, audible cracking or popping sound. It is relatively independent of heating rate — the total amount of fines produced when a sample is heated in 10 minutes is about the same as the quantity produced when the sample is heated to the same temperature over a six or eight hour period. Cooling and reheating, even at extremely high rates, does not cause further thermal fragmentation of such materials.

Samples taken from deeper parts of the ore body fragment more severely on heating than those mined nearer the surface. Stresses and strains induced into the material as it was being formed might be a strong contributing factor.

The softer, red appearing ores generally tend to reduce more easily and be less subject to thermal fragmentation. Those which have a pronounced laminar structure may tend to fracture at the lamination on heating, but when this does occur such a lump tends to break into smaller pieces. Other suitable ores include those whose formulations incorporate bound water which can give them a layered, foamy or interstitial structure; and which release the bound water under the influence of heat or pressure causing the ores to decrepitate. Materials that retain organic matter during formation are also suitable.

Figure 1:
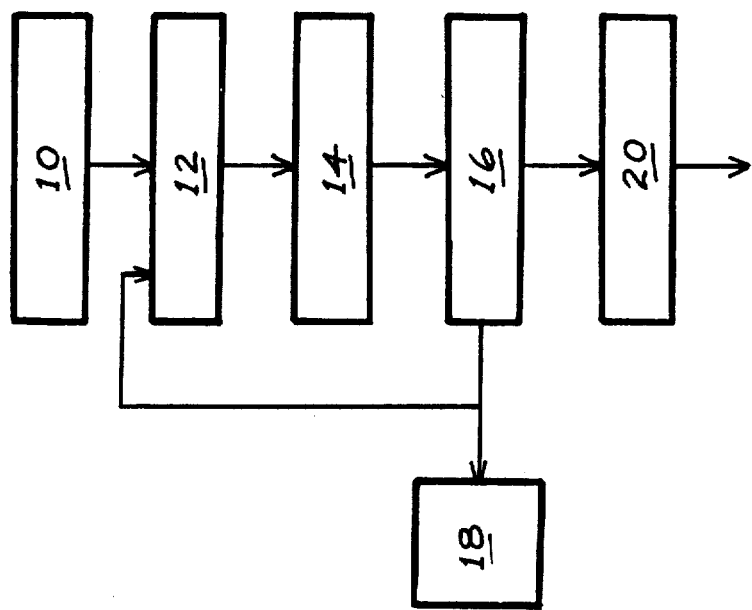
FIG. 1 is a schematic diagram illustrating a preferred system for carrying out the method of the invention.

Referring now to FIG. 1, sized lump ore in storage vessel or hopper 10 is fed to crusher 12 and thence to shaft furnace 14. The product exiting shaft furnace 14 is sized by screen 16. The oversized lump product can be used as feed for electric furnace 18 or can be recycled to crusher 12. The undersized material from screen 16, if sufficiently fine can pass directly to a containerizing facility 20 wherein the powdered product is placed in sealed containers to be shipped to its ultimate destination and use.

Particle size of the feed material is reduced in several ways. The feed material may be crushed in crusher 12 prior to being admitted to the shaft furnace. When the feed material is properly selected, the operating temperature and pressure of the furnace are sufficient to cause decrepitation of the ore during the simultaneous reduction of the ore by contact with reducing gases in the furnace.

The direct reduction shaft furnace 14, which contains a downwardly moving gravitational flow of feed material, reduces said feed material to substantially pure iron by counter-current flow of hot reducing gas consisting principally of CO and $H_2$. Furnace temperatures in the range of 1800° F to 2000° F tend to promote degradation depending on physical characteristics, and chemical make up of the feed. Thus the furnace is preferably operated within this range. The optimum furnace temperature is about 1850° F. However, with feed materials chosen for their decrepitation characteristics, the reducing gas temperature can be as low as about 1550° F and as high as about 2050° F. Generally, temperatures above about 2000° F tend to soften or melt the burden causing agglomeration, whereas temperatures below about 1700° F tend to decrease friability and decrease percentage of metallization. The furnace should be operated at a pressure in the range of 10 to 15 psi to create conditions suitable for degradation but can be operated at a pressure as low as 3 psig. Higher pressures tend to cause higher reactivity and higher metallization of material, increasing material quality. Lower pressures tend to cause the reverse. Differing raw material feed blends are selected to give differing results demanding alteration of furnace conditions to achieve optimum results.

Small amounts of water may be added to the feed material to promote decrepitation. Often residual moisture in ore stored in the open atmosphere is sufficient to promote decrepitation by creation of interior stresses in sedimentary laminated lump ores.

The product after exiting the bottom of the furnace and screening is ground or milled in any suitable milling or grinding machinery to insure uniform maximum particle size.

In order to prevent oxidation of the finely divided reduced iron powder, the iron powder product is packaged in sealed containers immediately upon exiting the final step in the process. The conditions which the sealing of the containers is carried out is selected to maintain the highest level of deoxidation. In the case of automatic packaging, the sealing process can be carried out in the presence of nitrogen or other inert atmosphere which will inhibit reoxidation of the iron powder.

Figure 2:
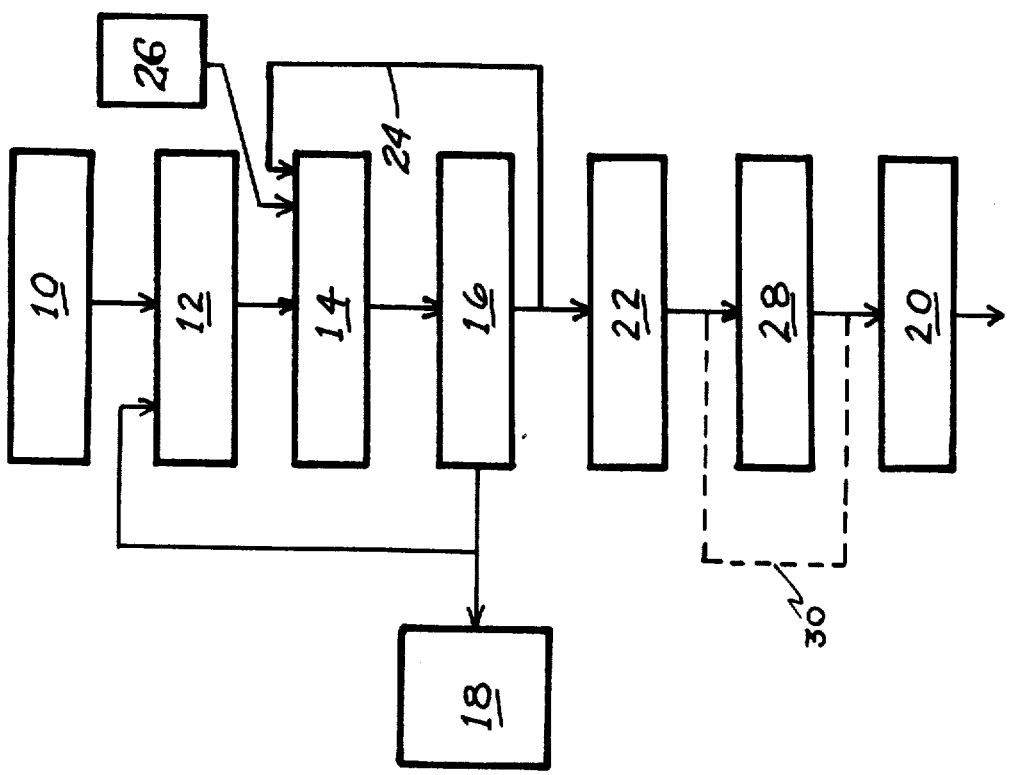
FIG. 2 is a schematic diagram similar to FIG. 1, but including a number of alternative embodiments.

A number of alternative embodiments are shown in FIG. 2. The fine powdered product passing screen 16 undergoes a further degradation step in apparatus 22 which may be a grinder or other mechanical device for degradation or any other degradation procedure. A portion of the material passing screen 16 can be recycled to shaft furnace 14 via line 24. Alternatively, oxide fines from other sources can be introduced to the shaft furnace 14 from bin 26. Recycling reduced material through the furnace constitutes a second reduction stage. However, additional reduction stage 28, such as a second smaller shaft furnace for reducing the powdered product to a higher purity can be added into this system, or the powdered product can by-pass this reduction stage as indicated by dotted line 30. In either event, the finely divided iron powder product is placed in sealed containers in containerizing facility 20 preparatory to shipping.

When the feed material is subject to decrepitation, or thermal fragmentation, it may be preheated to fragmentation temperature of at least 700° F prior to entering the furnace 14. This may be done in hopper 10 or crusher 12 or in some other convenient apparatus.

The particulate burden can be reduced in progressive stages, that is a first reduction is carried out in the reducing furnace, a second reduction in a subsequent crusher or other degrading apparatus and if desired, a third reduction may take place in still another stage through which undecrepitated material is recirculated.

Fine materials as produced in a direct reduction furnace in accordance with the parameters outlined herein have a metallization always in excess of 80 percent, but preferably at least 94 percent and normally on the order of 96 percent. In order to achieve a purity sufficient for blending with powders made by other more expensive techniques the fines product may be recycled through the reduction furnace to upgrade its average metallization to as high as 98 percent.

It can readily be seen from the foregoing that I have invented an improved method for making finely divided reduced iron powder suitable for powder metallurgy and other applications, as well as the resultant product which may be blended in varying amounts with powders of higher purity made by more sophisticated, more expensive methods, thus reducing the costs of the resulting blended powder.

From the above description it is apparent that the present invention provides a process and product which attain the principal and ancillary objects set forth above. Modifications may be made without departing from the spirit of the invention and no limitations are to be inferred except as specifically set forth in the appended claims.

What is claimed is:

1. A method for preparing iron powder from feed material selected from the group comprising particulate iron ore, lump iron ore iron oxide fines, pellets, nodules, balls, partially reduced iron and mixtures thereof, said method comprising:

a. selecting ores which are subject to decrepitation to be included in the feed material;
   b. reducing the particle size of said feed materials;
   c. establishing continuous a gravitational flow of said feed material through a generally vertical direct reduction shaft furnace;
   d. chemically reducing said feed material by countercurrent flow of a gaseous reductant through said feed material in said direct reduction furnace;
   e. controlling the reducing gas temperature between about 1550° and 2050° F to promote degradation of the feed material in said furnace;
   f. controlling the pressure in the reduction furnace between 3 and 15 pounds per square inch to promote degradation; and
   g. removing the reduced iron powder product from the furnace.

2. A method according to claim 1 wherein step (b) comprises heating said feed materials to at least about 700° F to promote decrepitation.

3. A method according to claim 2 in which said feed material is heated to at least 700° F prior to introducing said feed material to said reduction furnace.

4. A method according to claim 1 further comprising placing the reduced iron powder in sealed containers.

5. A method according to claim 1 further comprising mechanically degrading the material exiting the direct reduction furnace.

6. A method according to claim 1 further comprising passing said reduced iron powder through a second reducing stage.

7. A method according to claim 1 wherein the particle size of said feed material is reduced by decrepitation during simultaneous reduction in said reduction furance.

8. A method according to claim 1 further comprising controlling the moisture content, size, and quality of the feed material to promote degradation.

9. A method according to claim 1 wherein the particle size of said feed material is reduced by crushing.

10. A method according to claim 1 wherein said reducing gas temperature is maintained between about 1700° and 2000° F.

11. A method according to claim 1 further comprising screening said product and recycling oversized material to said furnace as feed.

12. A method according to claim 1 further comprising introducing finely divided material to the feed material to promote degradation.

13. A method according to claim 12 from 5 to 50 percent of the feed material is finely divided.

14. A method according to claim 1 further comprising recycling undecrepitated product to the furnace as feed material.

* * * * *